Aug. 7, 1956     O. H. BANKER     2,757,513
CONTROL VALVE FOR TRACK LAYING TRACTOR

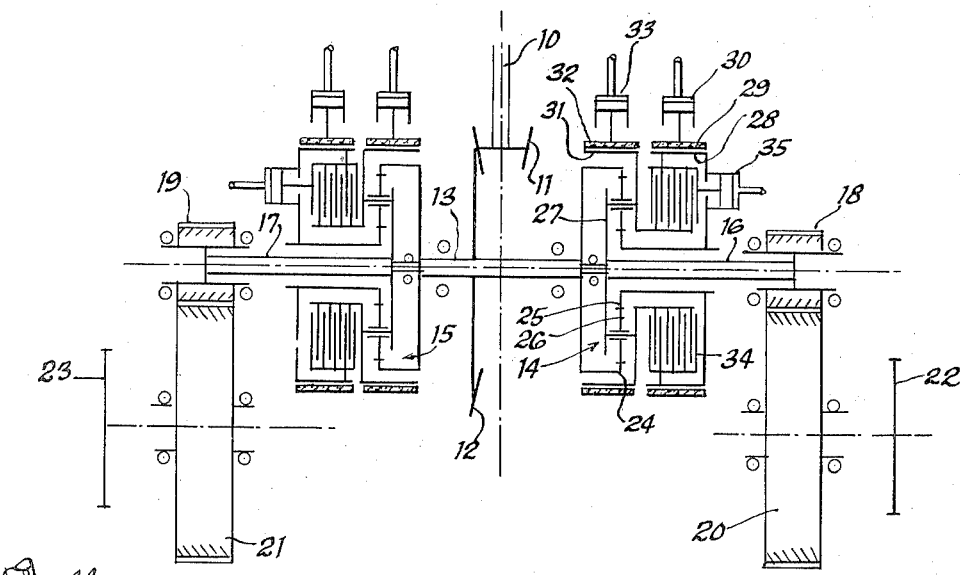
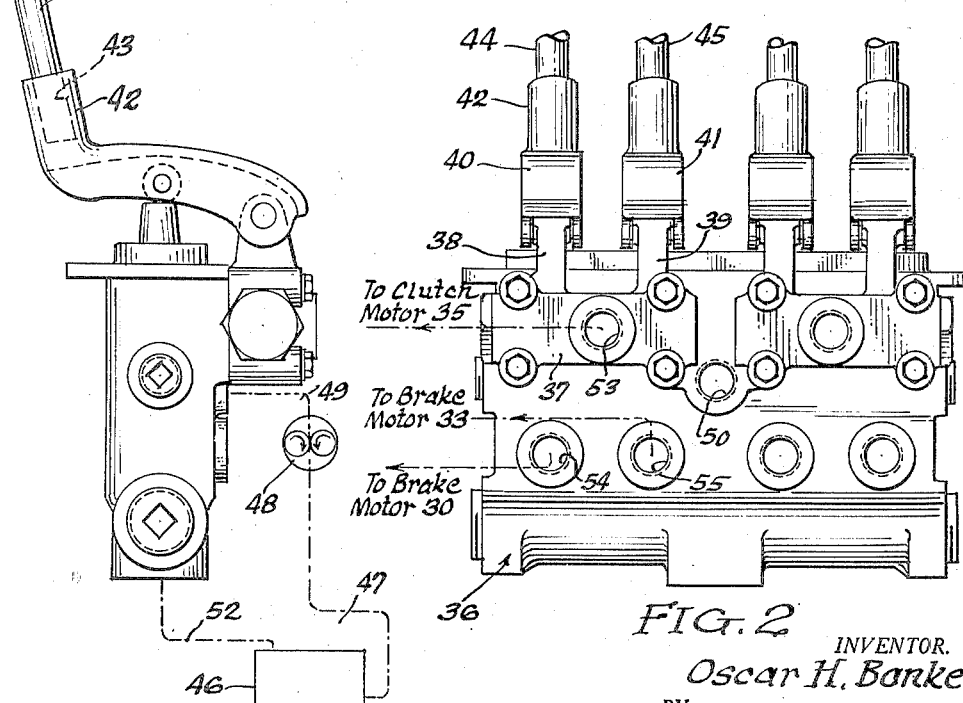

Filed Dec. 24, 1954     2 Sheets-Sheet 2

INVENTOR.
Oscar H. Banker
BY Charles J. Vontach
Att'y

United States Patent Office 2,757,513
Patented Aug. 7, 1956

2,757,513

CONTROL VALVE FOR TRACK LAYING TRACTOR

Oscar H. Banker, Evanston, Ill., assignor to New Products Corporation, Chicago, Ill., a corporation of Delaware Application December 24, 1954, Serial No. 477,495

9 Claims. (Cl. 60—97)

This invention relates to a control mechanism for turning track-laying tractors.

The usual steering control mechanism for a track-laying vehicle such as is used on road equipment and in farm implements comprises simply differential gearing and a brake mechanism for each track, the brakes being applied individually for turning purposes and simultaneously for arresting the movement of the vehicle. Thus when it is desired to make a right turn, the track on the right is retarded in speed by the brake mechanism, and because of the differential gearing normally used to drive the tracks, the left track is then power driven and the tractor pivots about the slow track. The power, however, is applied to the driven track in a speeded up ratio so that the torque available at the track is reduced, with a consequent reduction in pulling power of the tractor.

It is also well known that a track-laying vehicle has relatively little momentum and that the instant the power is cut off from the tracks, the tractor immediately comes to a stand still. It is desirable, however, to change the pulling power of the tractor by effecting a change in speed ratio in the transmission through which the tracks are driven from the tractor engine, since such an arrangement would permit the use of a lighter tractor for the same load, or would decrease the wear and tear on a tractor of a size presently recommended for a given load.

In my prior Patent No. 2,580,381 for Driving and Steering Mechanism, dated January 1, 1952, there is disclosed a transmission and steering mechanism for a track-laying tractor which will enable the tractor to make a long turn with power applied to both tracks. This mechanism involved the use of mechanical controls for part of the transmission and hydraulic controls for the remainder. Manual controls require considerably more effort than hydraulic controls and are more cumbersome.

An object of this invention is the provision of a simple and fully hydraulic control mechanism for a steering device for track-laying tractors which is simple to operate and which may be made quite rugged to withstand severe usage.

As another object, this invention seeks to provide a control mechanism for three fluid motors, the mechanism including two manually operable levers for controlling two valves, and a third valve controlled automatically by the hydraulic system in response to the operation of one or the other of the manually controlled valves.

A more specific object of this invention is the provision of a control mechanism for a planetary gear set having a lock-up clutch, a brake for the sun gear and a brake for the carrier of the gear set, the latter functioning also as the brake for the vehicle, said control including a valve directly operable by the operator for controlling the sun gear, an identical valve for controlling the carrier, and a shuttle valve for controlling the clutch, said shuttle valve being movable to positions corresponding to released and engaged conditions of the clutch in response to the operation of the manually controlled valves.

Another object of this invention is the provision of a manual control valve for the turning mechanism of a track-laying tractor or the like wherein the valve construction is such as to enable the operator to feel at all times the exact proportion of the force being exerted on the turning mechanism as he operates the valve, thus enabling him to operate the vehicle by "feel."

These and other objects of this invention will become apparent from the following detailed description when taken together with the accompanying drawings in which:

Fig. 1 is a schematic diagram of a transmission for track-laying vehicles to which the control mechanism of this invention may be applied;

Fig. 3 is a side elevational view of the left side of the valve block as shown in Fig. 2;

Figs. 7 and 8 are sections through the valve block corresponding to the section of Fig. 5, showing the valve in different positions in the block.

Figure 5:
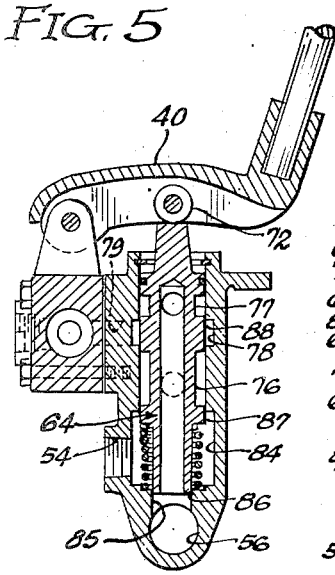
Fig. 5 is a right side elevational view in section of the valve block of Fig. 2.

Referring now to Fig. 1 for a detailed description of the steering and speed ratio changing mechanism to which the controls of this invention are particularly adaptable, the drive shaft from the engine is shown at 10 and has secured to the end thereof a bevel gear 11 in mesh with a bevel gear 12 mounted for rotation with a shaft 13 disposed with its axis substantially at right angles to the axis of shaft 10.

Disposed at the right hand end of shaft 13 (Fig. 1) is a planetary gear set 14, and at the left is a planetary gear set 15 having output shafts 16 and 17, respectively, connected to driving pinions 18 and 19, respectively. Pinion 18 is in mesh with bull gear 20 and pinion 19 is in mesh with bull gear 21. Bull gear 20 is directly connected to a sprocket 22 which drives the right hand track and bull gear 21 is directly connected to a sprocket 23 which drives the left track of the tractor.

Transmission 14 and 15 are identical in every respect and hence to save repetition, only planetary gear set 14 will be described in detail herein.

Planetary gear set 14 is comprised of a ring gear 24, a sun gear 25 and a plurality of planet gears 26 meshing with ring gear 24 and sun gear 25. Planet gears 26 are mounted on a carrier 27 directly connected to shaft 16.

Sun gear 25 is directly connected to a brake drum 28 which may be held against rotation by a brake band 29 controlled by a hydraulic motor shown schematically at 30. Carrier 27 is directly connected to a brake drum 31 which may be held against rotation by a brake band 32 controlled by a hydraulic motor 33. Carrier 27 and sun gear 25 may be locked for rotation together by a friction clutch 34 operated by a hydraulic motor 35.

It is contemplated that planetary gear set 14 will provide a reduced drive ratio and a direct drive ratio, and that carrier 27 and the associated shaft 16 and drive gear 18 may be held against rotation directly by brake band 32. Thus, it is possible in each planetary gear set 14, 15 to drive the tractor forwardly at a reduced speed ratio, or at a higher ratio, and by the controls hereinafter to be described, to drive one planetary gear set at a high ratio while the other is being driven at a low ratio to effect a long sweeping turn, or to drive one planetary gear set either at a reduced ratio or at a high ratio while the carrier of the other planetary gear set is held against rotation thereby to produce a short turn.

It is contemplated that clutch 34 will be normally engaged to provide a high speed drive for the tractor, but that it will be automatically disengaged whenever either sun gear 25 or carrier 27 is held against rotation by brake bands 29 and 32, respectively. By this arrangement it is necessary to supply only two manual controls, either one of which may be operated without regard to cordinating the operation of the control with the operation of the clutch motor 35.

Figure 2:
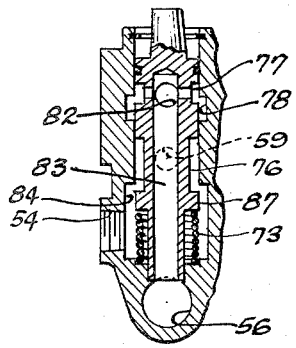
Fig. 2 is a rear elevational view of the valve block and manual controls therefor used to control the mechanism of Fig. 1.

The exterior of the controls is shown in Figs. 2 and 3. The valves for controlling both planetary gear sets 14 and 15 are contained in a single valve block 36 adapted to be secured by any suitable means to the tractor frame in such manner that the manually movable valves will be readily accessible to the operator of the tractor. The shuttle valve which controls the application of the clutch is located in a separate block 37 secured to the side of block 36. Shuttle valve block 37 has ears 38, 39 extending upwardly therefrom and supporting valve operating levers 40 and 41, respectively, which may be identical and interchangeable. Each said valve operating lever terminates in an upwardly extending boss 42 having a threaded opening 43 therein to receive the lower end of a rod 44 extending in proximity to the operator's hand or foot as the case may be. Thus, as shown in Fig. 2, rod 44 may extend upwardly in proximity to the operator's hand so that it may be operated thereby and rod 45 may terminate in a foot pedal (not shown).

Figure 4:
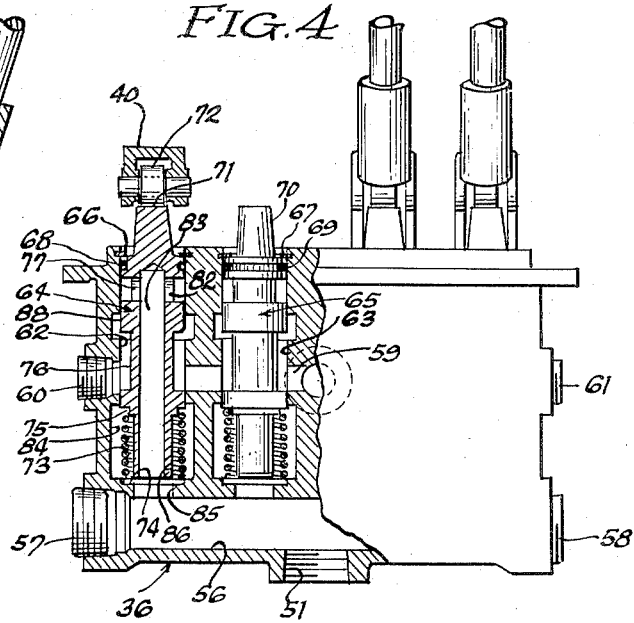
Fig. 4 is a front elevational view of the valve block of Fig. 2 with a portion of the block cut away to show the disposition and form of valves used therein.

Various openings are provided in the valve block 36 and shuttle valve block 37 by which fluid may enter or leave the blocks. A sump or container 46 provides a reservoir of fluid for the system, said reservoir being connected by any suitable conduit such as is shown schematically in Fig. 3 at 47 to a pump 48, and thence through a passageway 49, also shown schematically in Fig. 3, to the intake opening 50 (Fig. 2) in valve block 36. The return from valve block 36 is effected through an opening 51 (Fig. 4) in the bottom of valve block 36 and centrally disposed with respect to the ends thereof as shown in Fig. 4 and then through a return passageway 52 (Fig. 3) to the sump 46. An opening 53 in shuttle valve block 37 may be connected by suitable conduits (not shown) to clutch motor 35 while openings 54 and 55 may be connected through suitable passageways (not shown) to brake motors 30 and 33, respectively.

As stated previously, it is understood that the valves for the left hand track are identical in every respect with the valves for the right hand track, and that valve block 36 is symmetrical with respect to a vertical line drawn through the center thereof as viewed in Fig. 2. For this reason, just one-half of the block and the valves contained therein will be described herein.

Referring now to Figs. 4, 5, 6 and 7, block 36 has a relatively large through bore 56 disposed in the lower regions thereof and in direct communication with opening 51. Suitable threaded plugs 57 and 58 serve to close off the ends of bore 56. Above bore 56 and substantially parallel therewith is a second and smaller through bore 59 which intersects intake opening 50 so as to be open at all times to fluid under pressure from pump 48 and conduit or passageway 49. Bore 59 is closed at its ends by suitable threaded plugs 60 and 61 and is intersected by substantially parallel bores 62 and 63 in which are received identical valves 64 and 65. The valves are retained in their respective bores by snap rings 66 and 67 disposed in the upper regions thereof and are sealed with respect to said bores by packing, preferably in the form of resilient deformable O-rings 68, 69.

Each valve terminates in an upwardly extending stud 70 having a substantially flat end 71 over which may operate a roller 72 mounted for free rotation in lever 40. The valve is continuously urged upwardly against roller 72 by a spring 73 compressed between the bottom 74 of bore 62 and a shoulder 75 formed intermediate the ends of valve 64 for that purpose.

Valve 64 has a relatively wide peripheral groove 76 continuously in communication with bore 59, and a relatively narrow peripheral groove 77 disposed above groove 76 which may at times be aligned with a port 78 connected by a horizontal passage 79 (Fig. 6) to the bore 80 in shuttle valve block 37 in which shuttle valve 81 is adapted to reciprocate.

Groove 77 is connected by cross bores 82 to an axial bore 83 extending from the lower end of valve 64 and opening into a chamber 84 surrounding the lower end of said valve 64. Chamber 84 communicates through an opening 85 with through bore 56 which as stated previously is in direct communication through opening 51 and passageway 52 to the sump 46. The lower end 86 of valve 64 has an outside diameter which is substantially equal to the inside diameter of opening 85 so that when valve 64 is depressed and made to enter opening 85, chamber 84 is closed with respect to through bore 56. Chamber 84 is in direct communication with brake opening 54 so that when bore 56 is blocked off from chamber 84 by the lower end of the valve 86 extending into bore 85, fluid under pressure may be introduced to the brake to effect its operation.

The land 87 separating groove 76 from the lower end 86 of the valve 64 is of such axial extent that when valve 64 is depressed in its bore 62 to the limit permitted by spring 73, the lower edge of groove 76 will be in communication with the chamber 84 while the upper portion of the groove remains in communication with through bore 59 (Fig. 7). This causes fluid under pressure to be introduced into chamber 84 and from this chamber, through the appropriate passageways, to the fluid motor 30 for the sun gear brake. When valve 64 is in its uppermost position as shown in Fig. 4, the lower end of the valve is free of bore 86 and hence communication is established around said lower end of valve 64 through opening 85 into through bore 56 and vent opening 51 to the sump 46 to vent the motor 30.

The land 88 formed between grooves 76 and 77 is of such extent as to cause the upper region of groove 76 to be aligned with the lower region of port 78 when valve 64 is in its uppermost position as shown in Fig. 4 while the lower portion of groove 76 is still in alignment with through bore 59 thereby admitting fluid under pressure to horizontal bore 79. At the same time, groove 77 is blocked off from port 78 so that fluid pressure may be maintained in bore 79. In the lowermost position of valve 64 in its bore 62 (Fig. 7), the lower region of groove 77 is in alignment with the upper portion of port 78, thereby opening bore 79, through cross bores 82 and axial bore 83 to the through bore 56 and vent opening 51.

Figure 6:
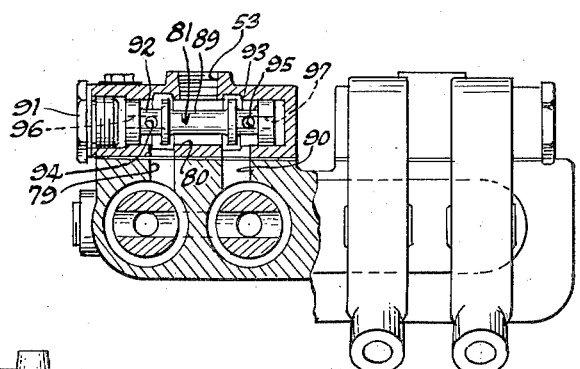
Fig. 6 is a plan view partly in section of the valve block of Fig. 4.

Shuttle valve 81 has a central peripheral groove 89 which, as shown in Fig. 6, is sufficiently wide to overlap horizontal bore 79 associated with valve 64 and a corresponding horizontal bore 90 associated with valve 65. Shuttle valve bore 80 is closed at its left hand end by a threaded plug 91 and the remaining length of bore 80 is slightly larger than the axial length of shuttle valve 81. Adjacent each end region of shuttle valve 81 is a peripheral groove 92, 93 each groove having cross bores 94 and 95 connecting with axially disposed bores 96 and 97 opening into the opposite ends of the bore 80.

The design of the system is such that as soon as the engine of the vehicle is started, pump 48 will start pumping fluid under pressure into intake opening 50, around valves 64, 65 into passages 79, 90 and out through valve 81 to clutch fluid motor 35, thereby engaging clutches 34 for direct drive. At such time, shuttle valve 81 will assume the position shown in Fig. 6. Thereafter, when the operator of the vehicle pulls on valve lever 40 to depress valve 64 to the position shown in Fig. 8, fluid from clutch motor 35 is vented to the sump through cross bore 80, vertical bore 84, horizontal bore 56 and line 52. As soon as the venting takes place, the pressure on the left side of the shuttle valve also drops, while at the same time fluid under full pressure from the pump starts flowing from port 90 behind valve 81. A definite pressure differential is created on opposite sides of valve 81 and the shuttle valve is then pushed to the side where low pressure exists, in this instance to the left, and closes passage 90. This prevents venting of the main line or the full pump outlet.

It may be observed that although groove 89 may at times be in communication with both bores 79 and 90 so that when one of them is vented the other may tend to be vented through the communication established by said peripheral groove 89, nevertheless there will be a slightly higher pressure on the side of the shuttle valve nearest the bore containing the fluid under pressure so that the valve will be moved toward the low pressure side until peripheral groove 89 is no longer in communication with the bore containing the pressure, whereupon the valve will be firmly held in a shifted position as required.

Valve 64 is shown in four positions in Figs. 4, 5, 7 and 8. In Fig. 4, it is shown in its uppermost position wherein hydraulic motor 30 is vented to release brake band 29 and communication is established between through bore 59 containing fluid under pressure and horizontal bore 79 to apply clutch motor 35. In Fig. 5, valve 64 is shown in intermediate position wherein its end 86 has entered opening 85 to close chamber 84 and condition it for the reception of fluid under pressure. At the same time land 88 has closed off port 78, thereby cutting off fluid under pressure from clutch motor 35. In Fig. 7, valve 64 has been moved downwardly to the lowermost limit of its movement, wherein through bore 59 containing fluid under pressure is in communication with chamber 84 and hence fluid under pressure is applied to hydraulic motor 30 to clamp brake band 29 to brake drum 28 and thereby arrest the rotation of sun gear 25. Simultaneously, communication is established from port 78 through cross bores 82 in valve 64 to the axial bore 83 which is in communication with through bore 56 to vent clutch motor 35 and simultaneously to move shuttle valve 81 to a position wherein it blocks passage of fluid under pressure from horizontal bore 90 to clutch motor 35.

It may be observed that the diameter of the opening 85 and of the portion of valve 64 which extends into said opening with a sealed sliding fit is smaller than the diameter of land 88. This means that when the valve assumes the position shown in Fig. 7 wherein fluid under pressure is present in chamber 84 and in peripheral grooves 76, valve 64 will be hydraulically unbalanced and will be urged upwardly against the downward pressure exerted upon it by lever 40. This unbalanced pressure provides the operator with a very desirable feel which enables him to gage the amount of braking action he is getting and hence enables him to apply the brakes gradually or abruptly or in varying degree as conditions warrant.

Figure 8:
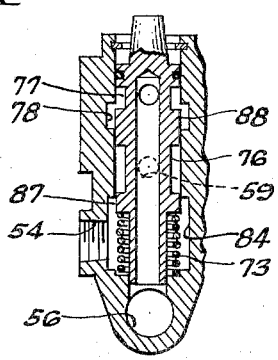

It may be seen, as shown in Fig. 8, that there is some overlap as between the closing of chamber 84 to fluid pressure and the opening of groove 78 to vent groove 77, so that before fluid pressure can enter chamber 84 the groove 78 will be partially opened and clutch motor 35 will be vented. Hence, when band motors are energized, there is no pressure in the clutch motor 35, thus preventing fighting between the band and the clutch.

It is understood that the foregoing description is merely illustrative of a preferred embodiment of the invention and that the scope of the invention therefore is not to be limited thereto but is to be determined by the appended claims.

I claim:

1. In combination, first, second and third fluid operated motors, a source of fluid under pressure, a manually operable valve controlling the application of fluid under pressure to the first motor, a second manually operable valve controlling the application of fluid under pressure to the second motor; mean including said valves, and operable incident to the shift of either said first or second valves, for rendering the third motor operative when the first and second motors are inoperative; and means for rendering said third motor inoperative when either one of the first and second motors is rendered operative.

2. In combination, first, second and third fluid operated motors, a source of fluid under pressure, a manually operable valve controlling the application of fluid under pressure to the first motor, a second manually operable valve controlling application of fluid under pressure to the second motor, a shuttle valve controlling the application of fluid under pressure to the third motor, means conducting fluid under pressure to the opposite ends of the shuttle valve, means conducting fluid under pressure from both the first and second valves through the shuttle valve to the third motor, and means responsive to shift of either the first or second valve to admit fluid under pressure to its respective motor to vent one side of the shuttle valve and simultaneously vent the third motor and block the passage of fluid under pressure to the vented third motor.

3. In combination, first and second fluid operated motors, a source of fluid under pressure, and valve means for controlling the application of fluid under pressure to the motors, said valve means comprising a valve block having an inlet passage, a vent passage, and an individual outlet passage for each motor, an axially reciprocable cylindrical valve interposed between the vent passage and the passage to one motor, said valve having a circumferential groove adapted to connect the inlet passage with the outlet passage for one motor to operate said one motor, said valve being hydraulically unbalanced in an axial direction by the fluid under pressure in the outlet passage to tend to disconnect the inlet passage from the said outlet passage upon the establishment of such connection, said valve having a second circumferential groove, said block having a passage connecting the second groove to the outlet passage for the second motor, said valve when moved axially to establish such connection connecting an outlet passage for the second motor to the vent passage and closing the passage from the first motor outlet passage to the vent passage.

4. In combination, first, second and third fluid operated motors, a source of fluid under pressure for operating said motors, and valve means for controlling the application of fluid under pressure to said motors, said valve means comprising a pair of valves, each having three passages therethrough, a third valve, a valve block for the valves and having ports connecting in one position of the pair of valves one passage of one valve with the source of fluid under pressure and with the third valve, and another passage with the motor controlled by the valve and with a vent opening, and in a second position of the pair of valves connecting the motor controlled by said one of the valves through the second passage with the source of fluid under pressure, and the third valve through a third passage with a vent opening, and said third valve being subject to pressure acting in one direction thereon by the fluid from one of the pair of valves and in the opposite direction by the fluid from the other of the pair of valves and adapted to assume a first position when pressure from both valves is substantially equal, a second position when pressure from one of said pair of valves exceeds the pressure from the other of said pair of valves and a third position when pressure from the said one of the valves is less than the pressure from the other of said pair of valves, and said block having ports and said third valve having a peripheral groove such that in the second and third positions of the third valve, the third motor is vented through said third valve and in the first position fluid under pressure is admitted to the third motor.

5. The combination described in claim 4, and means on said pair of valves for producing a hydraulic unbalance on the valves urging said valves to the first position thereof when said valves are moved to the second position thereof.

6. The combination described in claim 4, said block being provided with coaxially arranged stepped bores for each of said pair of valves and each of said pair of valves having one end thereof of reduced diameter adapted to enter the smaller of said stepped bores, fluid under pressure at such times surrounding the portion of the valves of lesser diameter.

7. A combination as described in claim 4, said valve block having valve bores disposed in substantially parallel planes to receive said pair of valves and having a vent bore crossing the axes of the valve bores, said valve bores each being stepped so as to be of reduced diameter immediately adjacent the vent bore, and each of said pair of valves having a longitudinal opening connected by cross bores to a peripheral groove adapted to be aligned with the passage to the third valve, whereby to vent said third valve through either of said pair of valves when said central bore in the pair of valves is in communication with the smaller of the stepped bores and the vent bore.

8. The combination as described in claim 7, the passage to each of the motors controlled by said pair of valves being in communication with the smaller of the stepped bores and being cut off from the smaller of said stepped bores when the corresponding valve enters said stepped bore.

9. The combination as described in claim 4, said third valve comprising a spool formed symmetrically with respect to a plane disposed at right angles to the axis of the spool and having a central peripheral groove separated by lands from spaced peripheral grooves disposed one at each end of the spool, and a cross bore communicating with a central bore opening into the end of each side of the spool, and the passageways from the pair of valves to said third valve being wider than the lands and surrounding said lands so as to be in communication with the central peripheral groove of the third valve and with an end groove at the same time when the third valve is in its said first position.

No references cited.